US008932658B2

(12) United States Patent
Falgout et al.

(10) Patent No.: US 8,932,658 B2
(45) Date of Patent: Jan. 13, 2015

(54) METHOD AND APPARATUS FOR STEAM-COOKING

(75) Inventors: Byron M. Falgout, River Ridge, LA (US); Brent A. Ledet, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 610 days.

(21) Appl. No.: 12/341,755

(22) Filed: Dec. 22, 2008

(65) Prior Publication Data
US 2010/0159099 A1    Jun. 24, 2010

(51) Int. Cl.
| | |
|---|---|
| *A23P 1/00* | (2006.01) |
| *A47J 27/00* | (2006.01) |
| *A47J 37/08* | (2006.01) |
| *A47J 37/04* | (2006.01) |
| *A23L 1/01* | (2006.01) |
| *A23B 4/005* | (2006.01) |
| *A23L 1/015* | (2006.01) |
| *A23L 1/33* | (2006.01) |

(52) U.S. Cl.
CPC .............. *A23L 1/0121* (2013.01); *A23B 4/0053* (2013.01); *A23L 1/0151* (2013.01); *A23L 1/33* (2013.01)
USPC ............... 426/510; 99/330; 99/335; 99/443 C

(58) Field of Classification Search
CPC ...... A23B 4/0053; A23L 1/33; A23L 1/0151; A23L 1/0121
USPC .......................... 426/510; 99/330, 335, 443 C
See application file for complete search history.

(56) References Cited

U.S. PATENT DOCUMENTS

| | | | |
|---|---|---|---|
| 2,365,519 A * | 12/1944 | Bloedorn | ...................... 426/643 |
| 2,767,667 A | 10/1956 | Spooner | |
| 2,908,234 A | 10/1959 | Naylor | |
| 3,501,317 A | 3/1970 | Veltman | |
| 3,581,652 A | 6/1971 | Chauvin | |
| 3,672,908 A | 6/1972 | Hice, Sr. | |
| 4,167,585 A | 9/1979 | Cardis et al. | |
| 4,173,215 A | 11/1979 | Bureau et al. | |
| 4,187,325 A | 2/1980 | Tyree, Jr. | |
| 4,340,613 A | 7/1982 | Moore | |
| 4,387,630 A | 6/1983 | Timbers et al. | |

(Continued)

FOREIGN PATENT DOCUMENTS

EP        0312335 A1    4/1989

OTHER PUBLICATIONS

Williams, HG, Davidson, GW, and Mamo, JC Heat-induced Activation of Polyphenoloxidase in Western Rock Lobster (*Panulirus cygnus*) Hemolymph : Implications for Heat Processing. Journal of Food Science (2003) 68(6): 1928-1932.*

(Continued)

*Primary Examiner* — Humera Sheikh
*Assistant Examiner* — Subbalakshmi Prakash
(74) *Attorney, Agent, or Firm* — James T. Cronvich

(57) ABSTRACT

Method and apparatus for steam-cooking food products to improve their appearance and decrease yield loss. A steam cooker includes a low-temperature, forced-convection cooking region in series with a high-temperature, steam-impingement cooking region. The food product is conveyed through both regions atop a foraminous conveyor belt. The temperature in the high-temperature cooking region is greater than the temperature in the low-temperature cooking region and less than or equal to 100° C.

11 Claims, 2 Drawing Sheets

(56) References Cited

U.S. PATENT DOCUMENTS

| | | | |
|---|---|---|---|
| 4,521,439 | A | 6/1985 | Bengtsson et al. |
| 4,582,047 | A | 4/1986 | Williams |
| 4,862,794 | A | 9/1989 | Lapeyre et al. |
| 4,887,524 | A | 12/1989 | Ellis-Brown |
| 4,949,629 | A * | 8/1990 | Leary et al. .............. 99/386 |
| 4,965,435 | A | 10/1990 | Smith et al. |
| 5,156,873 | A * | 10/1992 | Skrmetta .............. 426/510 |
| 5,184,538 | A | 2/1993 | Ledet |
| 5,248,514 | A | 9/1993 | Ledet et al. |
| 5,393,547 | A | 2/1995 | Balaban et al. |
| 5,410,951 | A | 5/1995 | Ledet et al. |
| 5,826,496 | A | 10/1998 | Jara |
| 6,274,188 | B1 * | 8/2001 | Ledet et al. .............. 426/510 |
| 6,447,827 | B1 * | 9/2002 | Andersen .............. 426/231 |
| 7,069,841 | B2 | 7/2006 | Ledet et al. |
| 7,798,059 | B2 | 9/2010 | Gunawardena |

OTHER PUBLICATIONS

Williams H G et al; "Polyphenoloxidase and its Thermal Deactivation in Western Rock Lobster (Panularis cygnus) Processing," Journal of Aquatic Food Product Technology, Food Product Press, Binghampton, US, vol. 16, No. 1, Jun. 1, 2007, pp. 1049-8850.

Montero et al; "Characterization of Polyphenoloxidase of Prawns (Peneus Japonicus) ). Alternatives to Inhibition: Additives and High-Pressure Treatment," Food Chemistry, vol. 75, 2001, pp. 317-324.

Williams H. G. et al.; "Heat-Induced Activation of Polyphenoloxidase in Western Rock Lobster (Panuliruscygnus) Hemolymph: Implication for Heat Processing," Journal of Food Science, vol. 68, No. 6, 2003, pp. 1928-1932.

International Search Report and Written Opinion of the ISA/EP of PCT/US09/67012, mailed Mar. 8, 2010, European Patent Office, Rijswijk, NL.

Laitram Machinery, Inc., "Model FC Cooker," sales brochure, 2007, Laitram Machinery, Inc., Harahan, Louisiana, U.S.A.

* cited by examiner

METHOD AND APPARATUS FOR STEAM-COOKING

BACKGROUND

The invention relates to the steam cooking of food products and, more particularly, to methods and apparatus for steam-cooking shrimp to reduce yield loss and improve their visual appeal.

Methods and apparatus for steam-cooking shrimp at low temperatures, i.e., temperatures below 100° C., to reduce yield loss are disclosed in U.S. Pat. No. 6,274,188, "Method for Steam-Cooking Shrimp at Reduced Temperatures to Decrease Yield Loss," Aug. 14, 2001. The patent describes a continuous-feed, forced-convection cooker operated with a steam-air mixture at atmospheric pressure at a temperature preferably about 88° C. to decrease the amount of yield lost through evaporation. Such a cooker operated as described works well at reducing the loss of yield of shrimp. But there are problems associated with such low-temperature cooking. First, shrimp and other food products contain an enzyme that causes melanosis, or "black spot" on the shell or outer surface of the food products. In the case of shrimp, as shown in FIG. 1, the black spots 10 detract from the physical appearance of the shrimp 12. Second, cooking at low temperatures can affect the color and, consequently, the appearance of the food product. For example, the appealing pink-orange color of cooked shrimp may not set if the shrimp are cooked at too low a temperature.

Thus, there is a need for cooking shrimp and other food products to reduce yield loss and to enhance their visual appeal.

SUMMARY

This need and other needs may be satisfied by a steam cooker embodying features of the invention. One example of such a cooker comprises a first cooking region in series with a second cooking region. The first cooking region, which is open to the atmosphere, has a first steam outlet injecting steam into the first cooking region. A conveyor conveys a food product, such as shrimp, along a conveying path through the steam cooker. An air circulator circulates air mixed with the injected steam along a convection path that intersects the food product being conveyed through the first cooking region. The first cooking region is maintained at a first temperature. The second cooking region has a second steam outlet proximate the conveyor to direct steam into the food product being conveyed through the second cooking region. The second cooking region is maintained at a second temperature greater than the first temperature and less than or equal to 100° C.

Another aspect of the invention provides a method for cooking a food product. The method comprises: (a) conveying a food product through a first cooking region open to the atmosphere; (b) circulating air mixed with steam along a convection path intersecting the food product being conveyed through the first region at a first temperature selected to thoroughly cook the food product; (c) conveying the food product through a second cooking region; and (d) injecting steam directly on to the food product being conveyed through the second region at a second temperature greater than the first temperature to heat the outer surface of the food product sufficiently to set the color of and deactivate the enzyme causing melanosis in the outer surface of the food product.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 2:
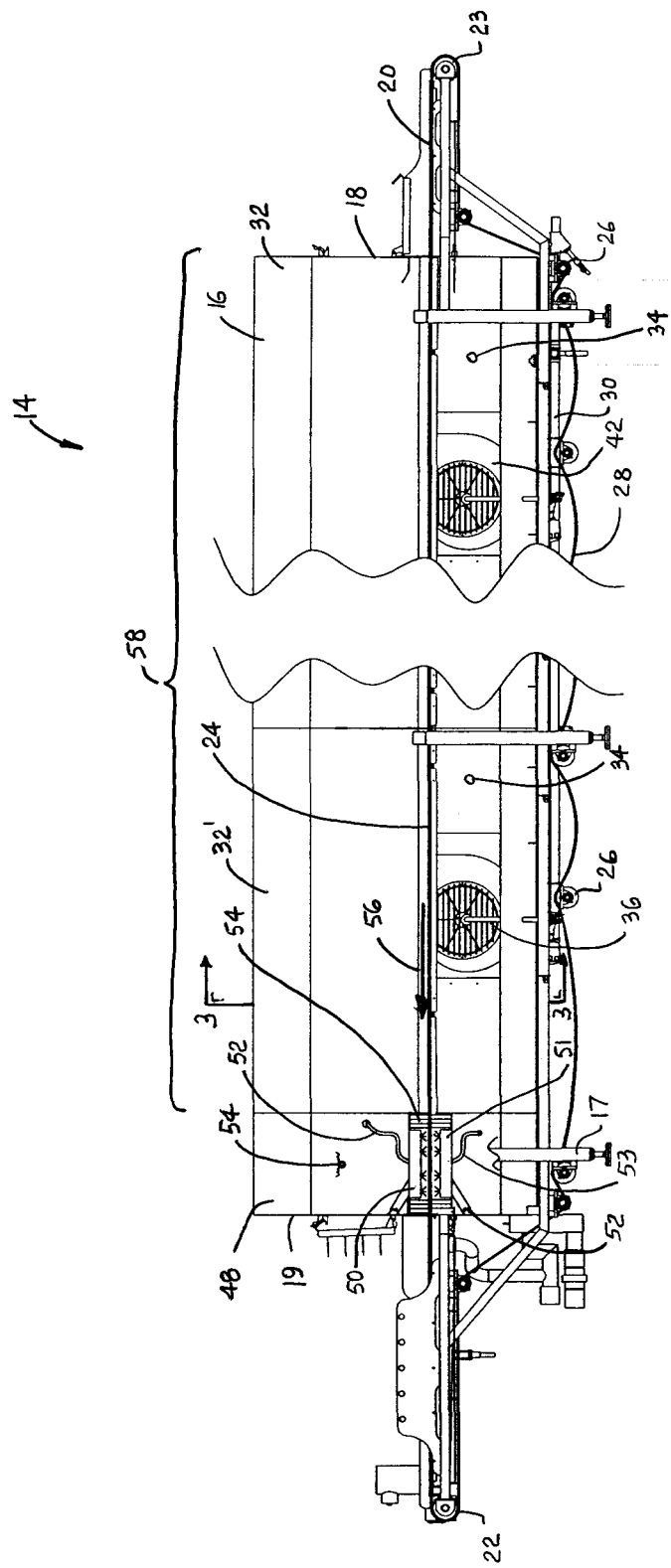
FIG. 2 is a side view of a portion of a steam cooker, with its facing sidewall removed for clarity, embodying features of the invention.

A steam cooker that operates according to and embodies features of the invention is shown in FIG. 2 with its facing side wall removed to better illustrate its components. The cooker 14 has an enclosure 16, open to the atmosphere, that is supported on legs 17 and extends from an entrance end 18 to an exit end 19. A foraminous conveyor belt 20 is trained around drive and idle sprockets 22, 23 at opposite ends of an upper carryway 24 that traverses the cooker. Diverting rollers or drums 26 guide the endless belt loop along a returnway 28 below the cooker. A network of steam pipes 30 inject steam supplied by a boiler or other steam source into the cooker through the bottom of the enclosure. The injection of steam is regulated by valves 31 (in FIG. 3) in the steam network.

Figure 1:
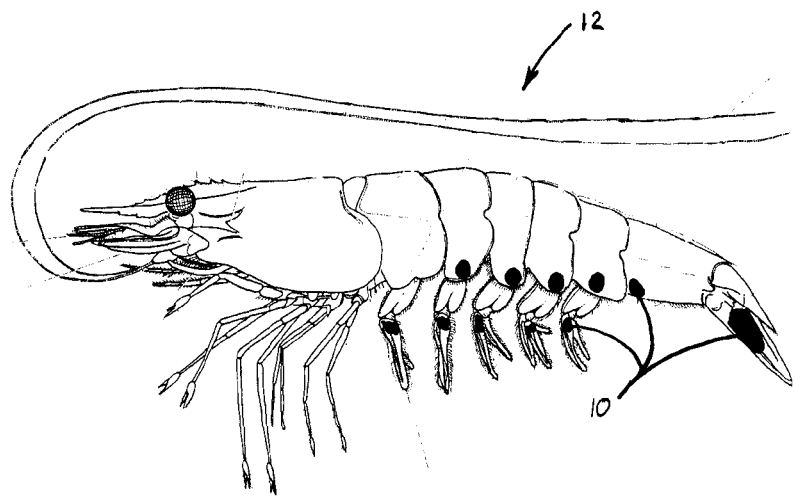
FIG. 1 is a pictorial view of a cooked shrimp with melanosis.
Figure 3:
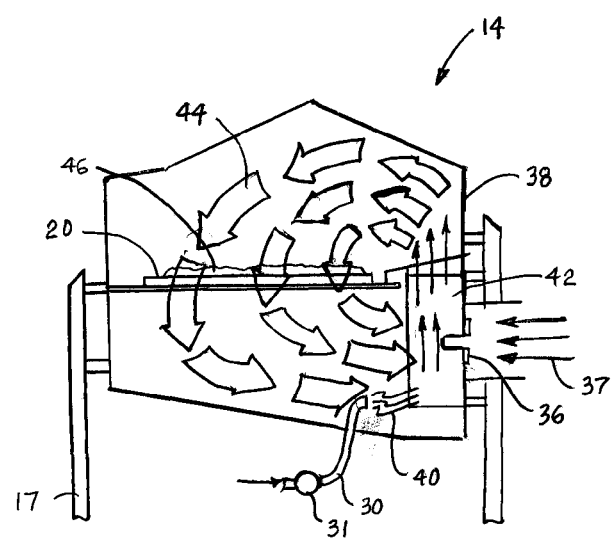
FIG. 3 is a cross sectional view of the steam cooker of FIG. 2 taken along line 3-3.

The cooker shown is modular with at least two identical cooking modules 32, 32'. More modules may be connected in series to lengthen the total low temperature cooking region. A single module could be used for products that require only a brief cook time. Each module is individually controlled with its own steam valves. A feedback signal from a temperature-sensing probe 34 in each cooker module is used by a cooker controller, such as a programmable logic controller, to control the opening of the steam-injector valve to maintain a predetermined cooking temperature in each module. The probe, the controller, and the valve provide a means for maintaining a pre-selected temperature in each module. Air circulators, such as fans 36 or blowers, draw air 37 into the cooker through one of the side walls 38, as also shown in FIG. 3. The fan also draws steam 40 injected into the cooker through openings in a plenum 42, in which the air and steam are mixed. The fan blows the air-steam mixture through openings in the top of the plenum. The air-steam mixture then circulates along a convection path, indicated by arrows 44, that intersects food products 46 being conveyed atop the conveyor belt 20 along the carryway. The belt is foraminous to allow the air-steam mixture to pass through and also to allow condensation to drain. Other features of such a forced-convection cooker as described thus far are given in U.S. Pat. No. 6,274,188, "Method for Steam-Cooking Shrimp at Reduced Temperatures to Decrease Yield Loss," Aug. 14, 2001, incorporated herein by reference. Because of the thoroughness of the forced-convection cooking described, cooking at temperatures of less than 100° C. at atmospheric pressure is possible. In fact, temperatures in the cooking region between about 75° C. and 87° C. seem to significantly decrease the yield loss to evaporation in the cooking of shrimp.

But cooking shrimp, for example, at such low temperatures does not allow the aesthetically pleasing pink-orange color caused by beta-carotene to set. Furthermore, cooking shrimp at such low temperatures does not deactivate the enzyme present in shrimp that causes melanosis, or black spot. Although neither the lack of color-setting nor the occurrence of black spots affects the gustatory quality of the shrimp, they both detract from their appearance and, consequently, the overall eating experience.

To improve the appearance of the cooked product, it is conveyed through a higher-temperature cooking region 48—in this example, downstream of the low-temperature region. The high-temperature region, which can be much shorter in length along the conveying path than the low-temperature region, includes upper and lower steam distributors 50, 51 supplied saturated steam through steam lines 52, 53. The distributors are positioned just above and below the belt along the carryway. Outlets in the distributors direct steam directly at the outer surfaces of the food product from above and through the open areas of the foraminous belt from below. Like the temperature probes in the low-temperature cooking region, a temperature sensor 54 in the high-temperature cooking region is used to maintain a predetermined temperature in the high-temperature region by controlling the injection of steam through the distributors and onto the surfaces of the food product. Unlike the forced-convection cooking in the low-temperature region, which cooks the food product to its core, the direct impingement of steam in the high-temperature region heats mainly the outside surfaces of the food product. For shrimp, a temperature of between about 90° C. and 100° C. in the cooking region is sufficient to set the color of the shrimp and to prevent the onset of melanosis. In particular, a temperature of between about 91.5° C. and 92° C. is preferred because that represents the minimum temperature in the high-temperature cooking region needed to prevent melanosis in shrimp.

The dwell time of the food product in the high-temperature region can be relatively short, for example, between 2 s and 10 s. And, because the high-temperature cooking sets the color and prevents melanosis, the food product can be cooked in the low-temperature region at even lower temperatures than if there were no high-temperature cooking region.

The steam distributors 50, 51 are attached by hinges 52 to the cooker enclosure for easy cleaning. Baffles, such as provided by flaps 54 at opposite ends of the distributors, confine the directly impinging steam to the food product and prevent too much steam from leaking out the exit of the conveyor or into the low-temperature region.

In operation, a food product is conveyed into the cooker 14 by the conveyor belt along a conveying path 56. The product is cooked in a first low-temperature cooking region 58 that may include one or more identical forced-convection cooking modules 32. Air is drawn into the modules and mixed with steam. The steam-air mixture is circulated by an air circulator, such as a fan, in a convection path that intersects the food product. The duration of the cooking—the dwell time—is set by the length of the low-temperature cooking region and the speed of the conveyor belt. The temperature of the cooking region is measured by a temperature probe and controlled by the amount of steam introduced into the cooker in each module. The dwell time of the food product in the low-temperature region is selected to thoroughly cook the food product, inside and out, at a relatively low temperature to minimize yield loss. The food product is then subjected to higher-temperature cooking in the high-temperature cooking region 48 for a shorter time, but long enough to set the color, prevent melanosis, or otherwise improve the appearance of the cooked product without significantly compromising the diminished yield loss of the low-temperature cooking.

Although the invention has been described in detail with respect to a preferred version, other versions are possible. As one example, the high-temperature region could precede the low-temperature region in some applications. As another example, steam in the high-temperature cooking region could be injected into the food product from above the conveyor belt only—or from below only. So, as these few examples suggest, the scope of the invention is not meant to be limited to the preferred version described in detail.

What is claimed is:

1. A steam cooker comprising:
    a first cooking region open to the atmosphere and having a first steam outlet injecting steam into the first cooking region;
    a conveyor conveying shrimp through the steam cooker along a conveying path;
    an air circulator circulating air mixed with the injected steam along a convection path intersecting the shrimp being conveyed through the first cooking region;
    means for maintaining a first temperature in the first cooking region,
    wherein the first cooking region is long enough along the conveying path to thoroughly cook the shrimp conveyed through the first cooking region at the first temperature;
    a shorter second cooking region, devoid of an air circulator, in series with the longer first cooking region and having a second steam outlet proximate the conveyor to direct steam into the conveyed shrimp;
    wherein the conveyor in the second cooking region includes a foraminous conveyor belt and the second steam outlet comprises outlets disposed proximate the conveyed shrimp above and below the foraminous conveyor belt to direct steam directly at the outer surfaces of the shrimp; and
    means for maintaining a second temperature in the second cooking region;
    wherein the second temperature is between 90° C. and 100° C. and the first temperature is between 75° C. and 87° C.; and
    wherein the speed of the conveyor and the length of the second cooking region subject the shrimp to a dwell time in the second cooking region much shorter than the dwell time in the first cooking region so that the steam directed at the outer surfaces of the shrimp prevents melanosis in the outer surfaces without cooking the interior of the shrimp further in the second cooking region.

2. A steam cooker as in claim 1 wherein the means for maintaining a first temperature comprises a temperature sensor in the first cooking region used to control the release of steam from the first steam outlet into the first cooking region.

3. A steam cooker as in claim 1 wherein the means for maintaining a second temperature comprises a temperature sensor in the second cooking region used to control the release of steam from the second steam outlet into the second cooking region.

4. A steam cooker as in claim 1 wherein the second temperature is between 91.5° C. and 92° C.

5. A steam cooker as in claim 1 wherein the second cooking region is downstream of the first cooking region along the conveying path.

6. A steam cooker as in claim 1 wherein the speed of the conveyor is controlled to subject the food product to a dwell time of between 2 s and 10 s in the second cooking region.

7. A method for cooking shrimp, comprising:
    conveying shrimp continuously at a first speed through a first cooking region open to the atmosphere;
    circulating air mixed with steam along a convection path intersecting the being conveyed through the first cooking region at a first temperature selected to thoroughly cook the shrimp;

conveying the cooked shrimp continuously at the first speed through a shorter second cooking region devoid of a convection path of circulating air mixed with steam so that the dwell time of the cooked shrimp in the second cooking region is much shorter than the dwell time of the shrimp in the first cooking region;

injecting steam from above and below proximately and directly onto the outer surface of the shrimp being conveyed through the second cooking region at a second temperature of between 90° C. and 100° C. wherein the first temperature is between 75° C. and 87° C., to heat the outer surface of the shrimp sufficiently to prevent melanosis in the outer surface of the shrimp without cooking the interior of the shrimp further.

8. The method of claim 7 wherein the second temperature is between 91.5° C. and 92° C.

9. The method of claim 7 wherein the food product is conveyed through the first cooking region before the second cooking region.

10. The method of claim 7 further comprising controlling the dwell time of the food product in the second cooking region to between 2 s and 10 s.

11. A steam cooker as in claim 1 wherein the second temperature is equal to 100° C.

\* \* \* \* \*